United States Patent [19]

Menon et al.

[11] Patent Number: 5,283,884
[45] Date of Patent: Feb. 1, 1994

[54] CKD CHANNEL WITH PREDICTIVE TRACK TABLE

[75] Inventors: Jaishankar M. Menon; John E. Lindley, both of San Jose; Robert W. Shomler, Morgan Hill, all of Calif.

[73] Assignee: International Business Machines Corporation, Armonk, N.Y.

[21] Appl. No.: 816,017

[22] Filed: Dec. 30, 1991

[51] Int. Cl.⁵ .......................................... G06F 12/00
[52] U.S. Cl. ................... 395/425; 395/600; 364/DIG. 1; 364/243.4; 364/243.41; 364/241.9
[58] Field of Search ................ 395/425, 400, 600

[56] References Cited

FOREIGN PATENT DOCUMENTS

0156179A2 10/1985 European Pat. Off. .
92310983 4/1993 European Pat. Off. .
2-264335 10/1990 Japan .

OTHER PUBLICATIONS

"Semi-Synchronous Cached DASD", IBM Technical Disclosure Bulletin, vol. 28, No. 5, Oct. 1985, pp. 1885-1888.

Primary Examiner—Paul V. Kulik
Attorney, Agent, or Firm—Baker, Maxham, Jester & Meador

[57] ABSTRACT

A method for managing cache accessing of CKD formatted records that uses a Predictive Track Table to reduce host delays resulting from cache write misses. Because a significant portion of CKD formatted DASD tracks contain records having no key fields, identical logical and physical cylinder and head (CCHH) fields and similar-sized data fields, a compact description of such records by record count and length data, indexed by track, can be quickly searched to determine the physical track location of a record update that misses the cache. The Predictive Track Table search is much faster than the host wait state imposed by access and search of the DASD to read the missing track into cache. If the updated record that misses cache is found within the set of records in the Predictive Track Table, then the update may be immediately written to cache and to a Non-Volatile Store (NVS) without a DASD read access. This update then may be later destaged asynchronously to the DASD from either the cache or the NVS. Otherwise, if not found in a predictive track, the update record is written directly to the disk and the cache, subject to the LRU/MRU discipline, incurring the normal cache write-miss host wait state.

9 Claims, 5 Drawing Sheets

PREDICTIVE TRACK TABLE

| CCHH1 | DL1 |
|---|---|
| CCHH2 | DL2 |
| ⋮ | ⋮ |
| CCHHx | DLx |

*FIG. 4A*

DL = DATA LENGTH

| CCHH1 | DL1 | LR1 |
|---|---|---|
| CCHH2 | DL2 | LR2 |
| ⋮ | ⋮ | ⋮ |
| CCHHx | DLx | LRx |

*FIG. 4B*

LR = LAST REC. NO

| CCHH1 | DL1 | LR1 | KL1 |
|---|---|---|---|
| CCHH2 | DL2 | LR2 | KL2 |
| ⋮ | ⋮ | ⋮ | ⋮ |
| CCHHx | DLx | LRx | KLx |

*FIG. 4C*

KL = KEY LENGTH

| CCHH1 | LA1 | DL1 | LR1 | KL1 |
|---|---|---|---|---|
| CCHH2 | LA2 | DL2 | LR2 | KL2 |
| ⋮ | ⋮ | ⋮ | ⋮ | ⋮ |
| CCHHx | LAx | DLx | LRx | KLx |

*FIG. 4D*

LA = LOGICAL ADDRESS

| CCHH1 | LA1 | DL1 | FR1 | LR1 | KL1 |
|---|---|---|---|---|---|
| CCHH2 | LA2 | DL2 | FR2 | LR2 | KL2 |
| ⋮ | ⋮ | ⋮ | ⋮ | ⋮ | ⋮ |
| CCHHx | LAx | DLx | FRx | LRx | KLx |

*FIG. 4E*

FR = FIRST RECORD

FIG. 5

CKD CHANNEL WITH PREDICTIVE TRACK TABLE

BACKGROUND OF THE INVENTION

1. Field of Invention

This invention relates generally to methods for controlling data flow in a Direct Access Storage Device (DASD) channel, and more specifically, to an efficient Count-Key-Data (CKD) DASD channel control system employing a Predictive Track Table.

2 Discussion of the Related Art

Use of Direct Access Storage Devices (DASDs) in a data processing system requires performance of certain Input/Output (I/0) functions. Data must be transferred between the DASD and the host processor. Such DASDs are often connected to a host processor through an I/O channel. The host Central Processing Unit (CPU) operating system initiates data transfer with a command to the I/0 channel. This shifts control to a series of Channel Command Words (CCW's) that are sent from the CPU over the channel to the DASD controller for effectuating data movement across the interface.

The channel forwards each CCW to the controller for a selected DASD. Once the channel passes a command to a particular controller, the command must be interpreted and the elements of the command must be executed by the DASD. The various functions of channel, controller and command interpretation can be integrated with the host processor or distributed between the host and the mechanical storage components of the DASD.

The DASD controller performs several functions, including the interpretation and execution of CCW's forwarded by a channel from the host CPU. Seek commands position a DASD access mechanism. Search commands cause comparison between data from main CPU storage and data stored on specified DASD areas. Write commands cause data to be transferred from main CPU storage to specified DASD areas. Read commands cause data copies to be transferred from DASD storage to main CPU storage and checked for validity.

Another important function of the DASD controller is the prescription of data storage format for the DASD. Such a format includes provisions for certain "non-data" information such as the track address, record address, and so forth. There are also unused spaces and error correction codes prescribed for the DASDs commonly encountered in widespread use.

Conventional track formats include an index point on each track of the recording surface indicating the physical beginning of the track. Also, on each track, there is normally one Home Address (HA) that defines the physical location of the track and the condition of the track. The HA normally contains the physical track address, a track condition flag, a cylinder number (CC) and a head number (HH). The combination of the cylinder number and head number indicates the track address is commonly expressed in the form CCHH. The HA contains the "physical" track address, which is distinguished from a "logical" track address. The physical and logical track addresses may differ for records stored in the DASD tracks.

The first record following the HA is commonly a track descriptor record, sometimes referred to as R0. One or more user data records follow R) on the track. The first part of each user record is an "address marker" that enables the controller to locate the beginning of the record when reading data from DASD. Each user record is commonly formatted in either a "count-data" (CD) or a "count-key-data" (CKD) format. The only difference between the CD and CKD formats is the presence of key fields and key length data in the CKD formatted record. Both are herein henceforth referred to as CKD records.

The CKD record consists of a count field, an optional key field and a variable-length data field. The typical count field is of the form CC (two bits of cylinder number), HH (two bytes of head number), R (one byte of record number), KL (one byte of key length), and DL (two bytes of data length). Thus, each CKD record is self-identifying. The CCHH in the count field (called "logical" CCHH) is typically the same as the cylinder and head numbers in the HA for the track containing the record (called "physical" CCHH), although not necessarily. Thus, a CKD track consists of the track header (HA and RO) followed by some number of CKD records. The CKD record numbers (R) may, but need not, increment along the track in a monotonic pattern of one, two, three, etc.

In the typical situation, user data is written or read in a data field of a CKD record in some track on some DASD. The channel specifies the device and the track within the device of interest. The channel may also specify the rotational position on the track from which to begin searching for the record having the data field to be read or written. This is accomplished by specifying a search parameter (five bytes in the form CCHHR) for use by the DASD controller to match against count fields in the track of interest. When the DASD controller finds a CKD record on the track with a count field that matches the search parameter, it then either reads or writes the corresponding data field, which is provided by the host through the channel for record writes. The fundamental feature of importance to this disclosure is that the disk controller is not permitted to read or write until it has verified the existence of a count field in the track that matches the channel search parameter. This means that a write command will force the channel to wait until the matching record is actually located on the rotating DASD medium. Of course, such a read wait state is reasonable because a CKD record cannot be read until located, but the only overriding reason for holding the CPU channel merely to locate the proper record for updating is to ensure error recovery.

The prior art is replete with methods for reducing and eliminating the host CPU wait states necessitated by DASD accesses for read and write. A DASD cache is a high-speed buffer store used to hold portions of the DASD address space contents in a manner that reduces channel wait states. In U.S. Pat. No. 4,603,380, Malcolm C. Easton, et al, disclose a method for DASD cache management that reduces the volume of database transfers between DASD and cache, while avoiding the complexity of managing variable length records in the cache. Easton et al, achieve this by forcing the starting point for staging a record to the beginning of the missing record and, at the same time, allocating and managing cache space in fixed length blocks.

Some DASD controllers known in the art, such as the IBM 3990 DASD controller, have some amount of relatively fast Non-Volatile Store (NVS) for storing records that have been written by the host system but not yet written to the DASD medium by the DASD controller. The NVS is additional to the high-speed cache buffer store commonly included in the typical disk controller. DASD controllers having both cache and NVS are said to perform "fast-write" operations.

A fast-write operation proceeds as follows. If a track record to be updated is already in cache (that is, a record count field is found in cache that matches the search parameters provided by the host computer), the cache copy of the record is updated in cache and another updated copy is made in NVS. The two copies of modified records are maintained for error recovery purposes to avoid single points of failure. After copying to NVS, the DASD controller returns a completion signal to the host system, freeing the host CPU to proceed with the next channel operation. Such an operation is called a "fast-write hit" and is completed well before the updated record is actually written to the DASD medium. At some later time, the DASD controller asynchronously destages the updated record to disk from the cache and then removes the record from both cache and NVS.

This explanation, made in terms of a single record, actually is better understood in terms of a single track. DASD controller cache memory is generally organized in fixed block sizes. Because a single track is often a fixed size while single records are not, the typical practice is to stage and destage data from cache to DASD and back again in single track increments.

With a "fast-write hit", the DASD controller can eliminate the disk access time from the channel write operation as perceived by the host CPU. The actual destage of the modified record from cache to disk can be accomplished at a more convenient time; for example, when the DASD controller is idle, or when there is other work to be done against the same track or cylinder as the one holding the modified record.

If the record to be updated was not originally located in cache, however, the "fast-write" operation becomes a "fast-write miss" and the DASD controller must then locate the record on a disk before releasing the channel. That is, a fast-write miss is treated as if there is no cache. After the disk controller locates the track, it must search the count fields of records in the track starting at any specified rotational position, and search for a matching count field. Once the matching count field is located, the DASD controller updates the corresponding data field on the DASD medium and, only then, returns a completion signal to the host CPU. The controller may also read the entire track into cache at the same time in anticipation of subsequent updates to records on the same track.

It will be appreciated that a "fast-write miss" is much slower than a "fast-write hit" because it includes a disk access delay as part of the response time seen by the host CPU. Thus, although the "fast-write" is a useful technique commonly used in DASD controllers to improve the performance of write operations from the host system, the effectiveness of this technique depends on the number of "fast-write hits". This is because the controller functions as slowly on a fast-write miss as it does without the fast-write capability. Thus, for applications exhibiting poor write-hit ratios, use of DASD controllers with fast-write capability will not materially improve DASD channel efficiency.

In U.S. Pat. No. 4,875,155, James L. Iskiyan, et al, disclose a cache and a DASD backing store in which CKD records are staged and destaged to provide a "fast-write" capability. Iskiyan, et al teach the use lookup tables for indicatinq whether cache record images are modified with respect to the DASD-stored versions of the same records. While the Iskiyan, et al technique improves the read and write access efficiency for a "fast-write" type of system, their technique does nothing to avoid the "fast-write miss" delays described above. There is a strongly felt need in the art for a technique that will make available the benefits of the "fast-write" caching scheme to applications exhibiting poor write-hit ratios. The related unresolved problems and deficiencies are clearly felt in the art and are solved by this invention in the manner described below.

SUMMARY OF THE INVENTION

This invention is a new technique for reducing the host CPU wait time associated with fast-write misses in a cached DASD store. The method of this invention is premised on the unexpected observation that a significant fraction of all CKD formatted DASD tracks contain records having substantially equal-size data fields and no key fields. These records are usually organized along the track in monotonically increasing record number order. The invention provides for storage of a Predictive Track Table (PTT) in high-speed RAM for use in predicting the location of records on such well-organized "predictive tracks". By storing two copies of the host-updated record and by predicting the precise DASD track location of the updated record, the DASD controller can immediately release the host CPU channel without risk of data loss and without waiting for verification of the actual record location in the target DASD track.

Examination of CKD formatted system usage in the data processing industry has led to the unexpected discovery that certain host operating systems almost always ensure that the logical record CCHH is identical to the physical CCHH location of CKD records in the DASD track. It was also discovered that the preponderance of CKD tracks are "predictive" in that the CKD records have no key fields, have substantially equal-size data fields and have record numbers in the track that increase monotonically from unity. Examination of channel programs widely used in the art has led to the unexpected observation that most host update writes are to predictive tracks. Thus, improved performance of such update writes to predictive tracks will lead to a significant overall improvement to system performance without actual improvement of cache fast-write hit ratios.

It is an objective of this invention to improve the efficiency of applications that exhibit poor write-hit ratios without a concomitant increase in DASD cache size or complexity. It is another object of this invention to accommodate variations in the proposed predictive track configurations.

It is an advantage of this invention that, for CKD formatted DASD control units, the method eliminates DASD access time components from the host response time for most update write requests. Controllers such as the IBM 3990 already eliminate DASD access time from host CPU service time if the accessed record is found in cache, but not otherwise. Therefore, it is a significant advantage of this invention that applications having poor write-hit ratios, including many of the newer applications, are made more efficient by the method of this invention.

This method has other additional advantages when applied to Fixed Block (FB) DASD controllers known in the art for emulating CKD storage functions. This method eliminates a DASD access normally required for such FB/CKD emulation. It is another advantage of this invention that, when applied to CKD emulation in which all the CKD records are packed tightly into FB sectors, the FB DASD controller can be operated at twice the normal speed because of improved update efficiency.

It is yet another advantage of the method of this invention that certain FB DASD FB/CKD emulation techniques can be simplified by eliminating, for predictive tracks, the normal requirement to store emulated count fields on the FB sectors of the DASDs. This is possible because the Predictive Track Table is defined to comprise sufficient information to recreate the necessary count fields for predictive tracks.

The foregoing, together with other features and advantages of the present invention, will become more apparent when referring to the following specifications, claims and the accompanying drawings.

BRIEF DESCRIPTION OF THE DRAWINGS

For a more complete understanding of this invention, reference is now made to the following detailed description of the embodiments illustrated in the accompanying drawings, wherein.

DETAILED DESCRIPTION OF THE PREFERRED EMBODIMENTS

The Existing Art

Figure 1:
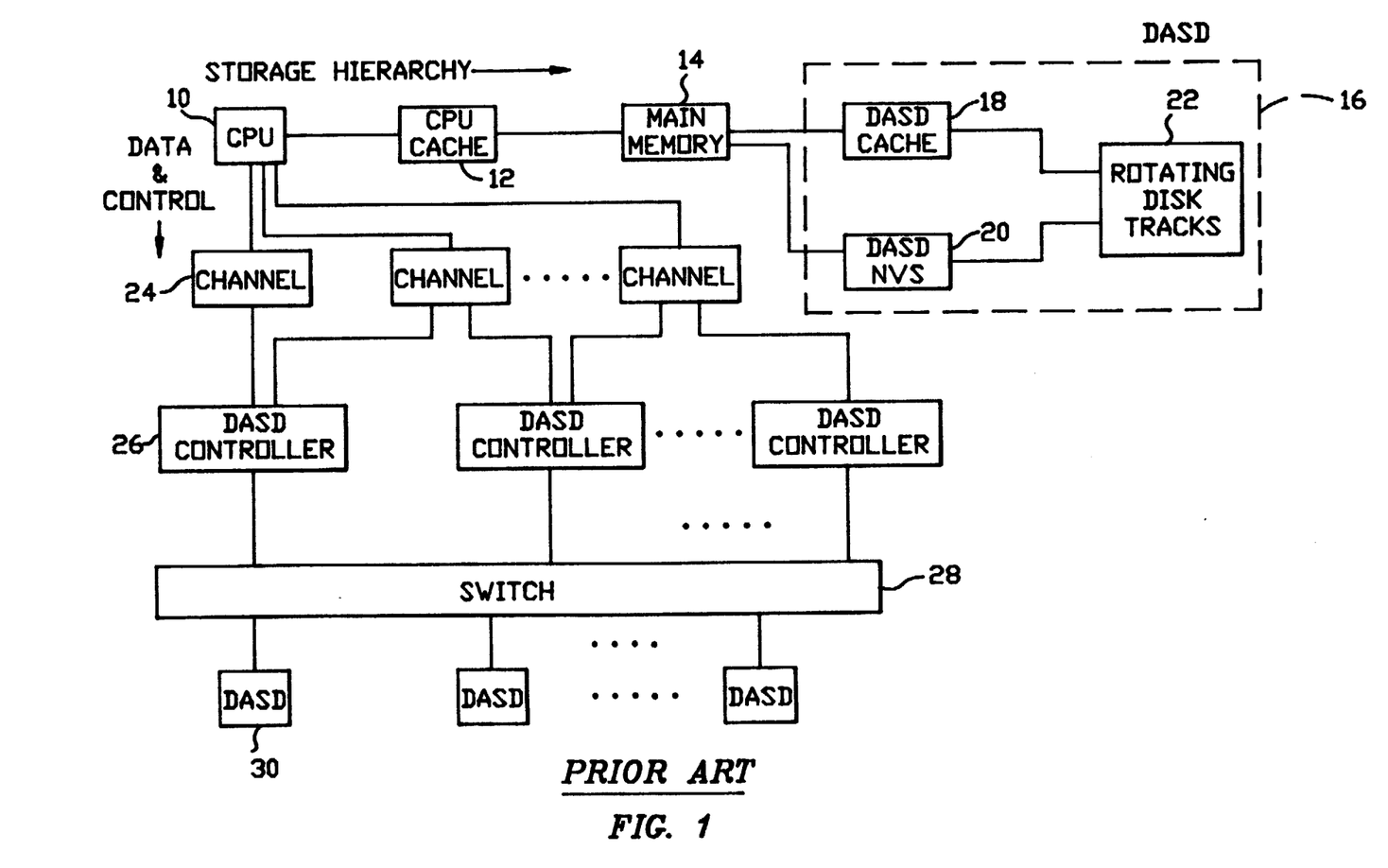
FIG. 1 shows a CKD DASD channel and controller configuration known in the prior art.

FIG. 1 illustrates the typical memory hierarchy and typical Direct Access Storage Devices (DASDs) CPU control paths well-known in the art. The upper portion of FIG. 1 shows a CPU 10 interfacing with a high-speed CPU cache 12 and therefrom to a main memory 14. Main memory 14 is then connected to an exemplary DASD 16, which is shown having a DASD cache 18, a DASD Non-Volatile Storage (NVS) 20, and a plurality of tracks on a rotating disk 22. It will be appreciated that other archival memory devices may be attached to DASD 16 as well.

The lower portion of FIG. 1 illustrates the data and control paths known in the art for CPU references to lower elements in the memory hierarchy. CPU 10 is connected through a plurality of channels exemplified by channel 24 and a group of DASD controllers exemplified by controller 26 to a switch 28 serving to select one of several available DASDs exemplified by the DASD 30. DASD 30 can be the same device illustrated above as DASD 16. CPU 10 passes Channel Command Words (CCWs) through channel 24 to controller 26 for use in selecting and controlling the disposition of read and write references to DASD 30 in one of many useful ways known in the art.

Among the many DASD architectures known in the art, the IBM Count-Key-Data (CKD) and Extended CKD (ECKD) are particularly useful. See, for instance, Marilyn Bohl, "Introduction to IBM Direct Access Storage Devices", Science Research Associates, Inc., 1981, for a detailed description of the CKD architecture. The CKD format permits variation in record sizes and numbers on each DASD track, as compared with the Fixed Block Architecture (FBA) also well-known in the art.

Figure 2A:
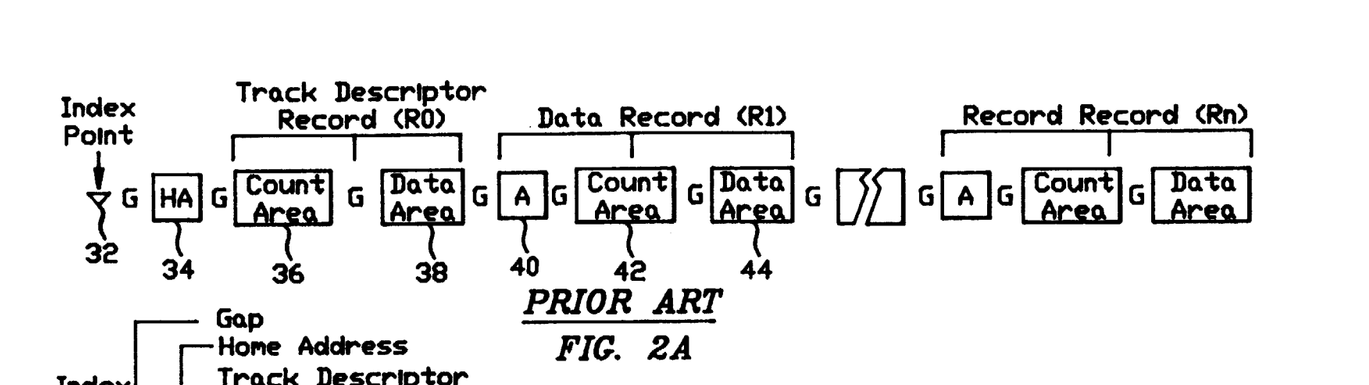
FIGS. 2A-B, illustrate the CD and CKD record formats known in the prior art.
Figure 2B:
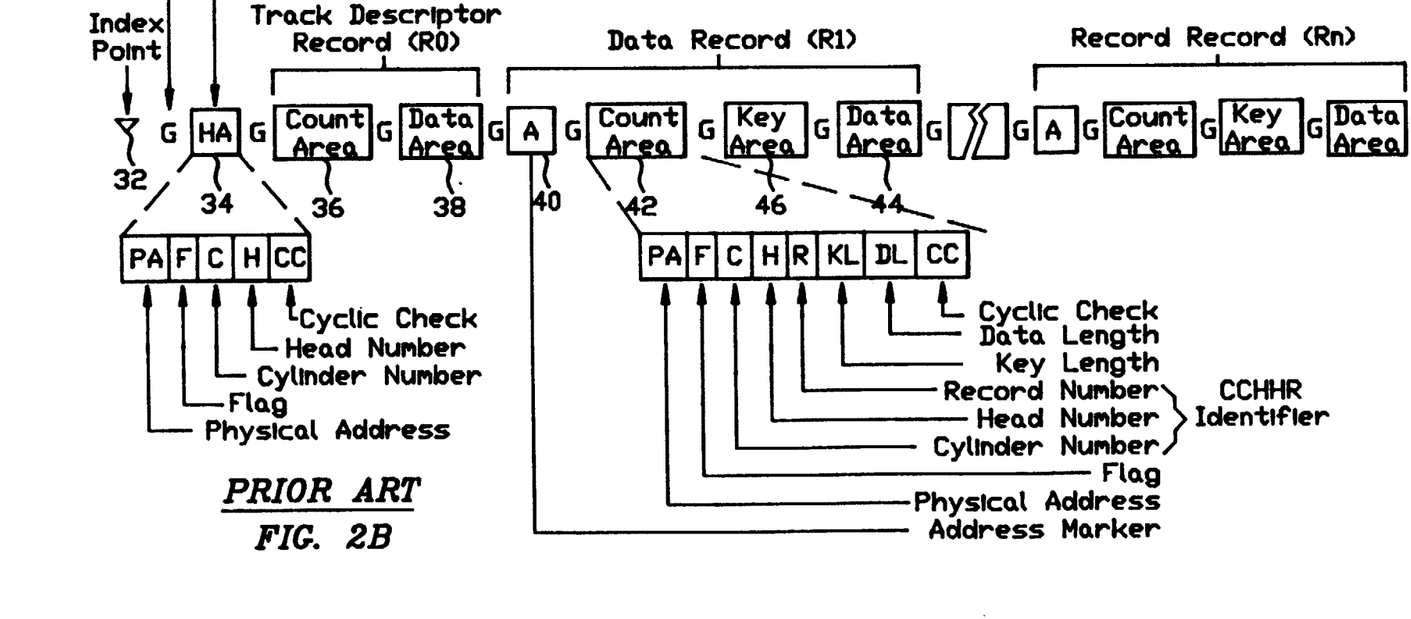

FIGS. 2A-B show the details of the CD and CKD formats known in the art. In FIG. 2A, the CD track begins at index point 32 and, after a brief physical Gap (G), first contains the Home Address Area (HA) 34. FIG. 2B shows the contents of HA 34, which includes Physical Address (PA), Flag (F), Cylinder Number (C) and Head Number (H) (generally written in combination as CCHH), and Cyclic Checksum (CC). The cylinder and head numbers written in HA 34 are denominated the "logical" cylinder and head location of the track.

Returning to FIG. 2A, the CD track next contains a Track Descriptor Record (R0) containing Count Area 36 and Data Area 38. There is no provision for a Key Area in R0 as will be appreciated by referring to FIG. 2B. Otherwise, R0 may contain either system or user data or a combination of both.

Inspection of FIG. 2B will reveal that the only difference between the CKD format in FIG. 2B and the CD format in FIG. 2A is the presence of a Key Area (KA) 46. Thus, as used herein, "CKD format" is intended to encompass the CD format and the CKD format, unless specifically noted otherwise.

Each track contains anywhere from zero to some maximum number (n) subsequent user data records followed by blank space. Referring to FIG. 2A, for instance, the remainder of the CD formatted track contains a series of user data records (R1-Rn), each such record having an Address Marker (A) 40, a Count Area (CA) 42 and a Data Area (DA) 44. The first part of each record in FIG. 2B is an address marker (A) exemplified by A 40. The content of this two-byte area is supplied by the DASD controller as the record is written and enables the controller to locate the beginning of the record when searching and reading data from the DASD.

FIG. 2B shows the detailed contents of Count Area (CA) 42, which exemplifies the CA in every record. CA 42 consists of a Physical Address field (PA), a Flag (F), a record identifier consisting of cylinder and head number (CCHH) followed by a Record number (R), a Key Length (KL), a Data Length (DL), and a Cyclic Checksum (CC). Generally, the PA field in each record is the same as the PA field in Home Address 34 and represents the "physical" cylinder and head location of the track. Also, generally, the CCHH field in each record count area is the same as the CCHH field in HA 34, representing the "logical" track number for the record.

In FIG. 2A, the Key Length is always zero because there is no Key Area 46. When the Data Length field is set to zero, this indicates an end of file record. Finally, as is known in the art, the contents of KA 46 may be repeated in DA 44.

The logical CCHH in CA 42 is typically the same as the physical address (PA) although it is not required to be so. The record number (R) fields in each of the records on the track are not constrained to proceed in any particular pattern, but often are monotonic starting with the number 1 and proceeding to some maximum number n, which must be no greater than 255 for a single byte (R) field.

The typical channel program known in the art functions to either read or write a CKD record data field on some track in some DASD. Such a channel program specifies the DASD and the cylinder within the DASD of interest. It also typically specifies a rotational position on the track from which to begin looking for the record whose data fields is to be referenced. Next, it specifies a search parameter in the form of CCHHR for use by the DASD controller to match against the relevant portion of the Count Areas in the track of interest. When the DASD controller locates a CKD record on the track with a matching Count Area, the controller then either reads or writes the referenced Data Field. The notable feature of this process relevant to this disclosure is that the DASD controller does not perform a read or write reference until it has accessed the DASD and verified the existence on the track of a Count Area with the matching search parameters.

To better appreciate the significance of this requirement, reference is made to FIG. 1. DASD controller 26 is shown having some amount of DASD NVS 20 for storing records that have been written by host CPU 10 but have not yet been written to DASD 16 by controller 26. Such controllers are said to perform "Fast-Write" operations. Controller 26 also has access to optional DASD cache 18 for storing records in track-sized blocks or lines from the attached rotating medium.

For example, the IBM 3990 disk controller is typical of such apparatus, having both cache and NVS. The IBM 3990 disk controller performs an update write operation as follows. If the referenced track and record are already in cache and a record that matches the search parameters is found by cache reference alone, the cache record is updated and a copy is made to NVS to avoid single points of failure. The controller then returns "done" to the host CPU. Such an operation is called a "Fast-Write Hit". At some later time, the IBM 3990 controller asynchronously destages the updated record or track to disk from cache, removing the record or track from both cache and NVS. With a Fast-Write Hit, the 3990 controller can eliminate the disk access time normally required to write a record to disk from the response time as seen by the host system. The actual destaging of the modified record from cache to disk can be accomplished at a more opportune time; for example, when the disk is idle or when there is other work to be performed against the same track of cylinder. If the record accessed was not originally in cache, however, the resulting "Fast-Write Miss" forces the 3990 controller to first access the physical track on disk before releasing the host CPU.

With a Fast-Write Miss, after track access is accomplished, the controller must search the count areas of each record in the track, beginning at any specified rotational position, until a matching count area is found. Once the matching count area is found, the corresponding data field is updated and "done" is returned to the host CPU. This description clearly shows that a Fast-Write Miss is much slower than a Fast-Write Hit, because it includes a physical disk access in the response time presented to the host CPU.

Accordingly, for higher write-hit ratios, the Fast-Write procedure results in significant improvements in DASD channel efficiency. However, because the controller operates as if Fast-Write capability is unavailable on a write-miss, any applications exhibiting poor write-hit ratios will not benefit from Fast-Write controller procedures.

The Invention

Examination of actual system usage in the art has demonstrated that many operating systems normally ensure that the logical CCHH in the Count Areas of CKD records is always the same as the physical cylinder and head number on the which CKD record is stored (the physical CCHH). Also, it has been determined that a preponderance (75%) of such CKD tracks are "predictive". A predictive track is defined herein as having characteristics permitting the prediction of count areas on the physical track. For example, such a definition may be one in which records have no key fields, have the same size data fields, and in which the record numbers R of the records along the track increase monotonically from unity. Examination of existing channel programs has revealed that most (95%) update writes are to such predictive tracks. Thus, it was discovered that unexpected and significant efficiency improvements are available through any measure designed to improve the performance of update writes to predictive tracks.

In the exemplary predictive track defined above, knowledge of the last record number stored on the track is sufficient to determine the presence of a particular record having a particular Count Area on the track. For example, consider that cylinder 100, head 50 is a predictive track and that the last record number on the track is known to be 20. When the channel program provides (100, 50, 7) as the CCHHR search parameter, knowledge of the last record on the track is sufficient to determine that the reference record 7 is present, without actually referring to a cache copy of the records on the track. Similarly, it is unambiguously known that other search parameters, such as (100, 50, 25) or (100, 40, 7), will not be satisfied because the record number exceeds the maximum in the first example or the head number is different in the second example.

The method of this invention requires the maintenance of a Predictive Track Table (PTT) in high-speed memory, either within the DASD controller or within the main memory of the channel. The PTT is configured to specify whether the accessed track is predictive and, for such predictive tracks, whether a specified record is present in the track. Also, the nature of CKD architecture requires inclusion in the PTT of the Data Length value common to all the records in the track for use as a check for channel access errors.

Figure 5:
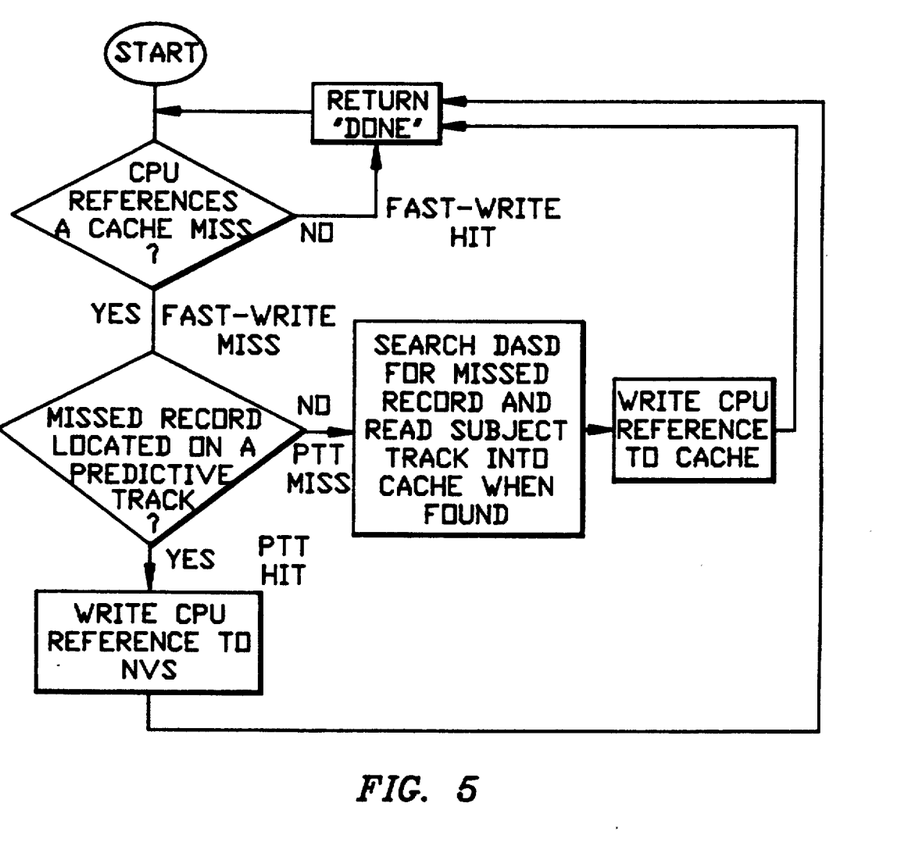
FIG. 5 shows an illustrative example of a flow chart for the method of this invention.

In operation, the method of this invention is illustrated by the following example, which may be appreciated by referring to the exemplary flow charts in FIG. 5. Consider an update write to cylinder 100, head 50 of some DASD. If a DASD cache store is provided (this is not necessary), it is first searched for the referenced track. If the referenced track is located in cache, the procedure then becomes identical to that described above for a Fast-Write Hit. If the track is not located in cache, the PTT is next consulted to determine if the subject track is predictive. If the track is not predictive, the process then proceeds as was described above for a Fast-Write Miss. If the track is predictive, the PTT is consulted to obtain the last record number on the track (e.g., 20) and for the Data Length (e.g., 1000 bytes). If, for example, the search parameter is (100, 50, 9), the controller can proceed to accept the record from the host channel, storing one copy in NVS and another copy in cache. At acceptance, the update record data is checked to ensure that it is exactly 1000 bytes in size (referring to well-known rules for CKD controllers in the event that either more or less than 1000 bytes is provided by the host channel). After Data Length verification and storage in NVS and cache, the channel is immediately released by the DASD controller.

In cases where no DASD controller cache is provided, two copies of an update record can be stored in NVS to avoid single points of failure. In such a system, all references from the host CPU would be treated as Fast-Write Misses. The first step of the non-cache method of this invention is to refer to the PTT to determine if the referenced track is predictive. Following PTT reference, the controller then proceeds according to the above example. In either the cache or the non-cache example discussed above, the method of this invention eliminates this excess time from host response time for most update writes. The actual destage of the updated record from cache/NVS to disk occurs asynchronously with respect to the host channel. For uncached controllers, performance for most update writes is improved. For cached controllers, performance for most update writes that miss the cache is improved.

The method of this invention discussed above is illustrated in FIG. 5. The exemplary flow chart in FIG. 5 is sufficient to permit the preparation of a suitable computer program embodiment of this method by a practitioner knowledgeable in the computer science arts.

FIGS. 3 and 4 present variations on the concept of a "Predictive Track" format suitable for use in the method of this invention. Illustrative Predictive Track Table formats suitable for use with the predictive track definitions in FIG. 3 are illustrated in FIG. 4. FIG. 3A is the preferred definition of a predictive track, requiring only the identifier field and data length field PTT elements shown in FIG. 4A. This embodiment provides a simple and compact PTT, which can be referenced with relatively simple logic to determine the presence or absence of a referenced record in a predictive track. Because each predictive track is filled with the same number n of user records, and because each track begins with record number $R=1$, any host update record reference can be immediately examined to determine if the referenced record number falls between $(1-n)$. The DL field is then checked for CKD error states in a manner well-known in the art by reference to PTT Data Length field.

Figure 3A:
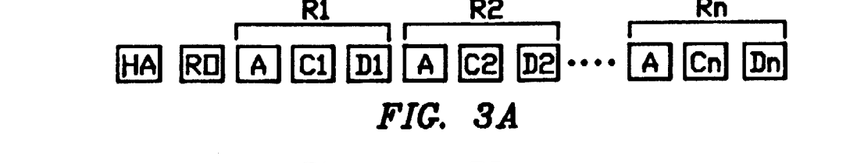
FIGS. 3A-E, show a series of variations on the predictive track formats proposed for this invention.
Figure 3B:
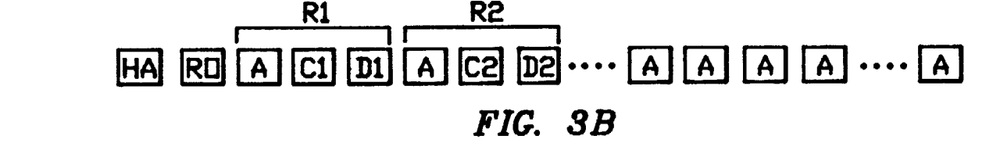
Figure 3C:
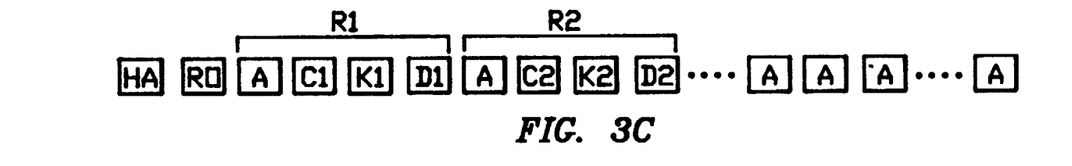
Figure 3D:
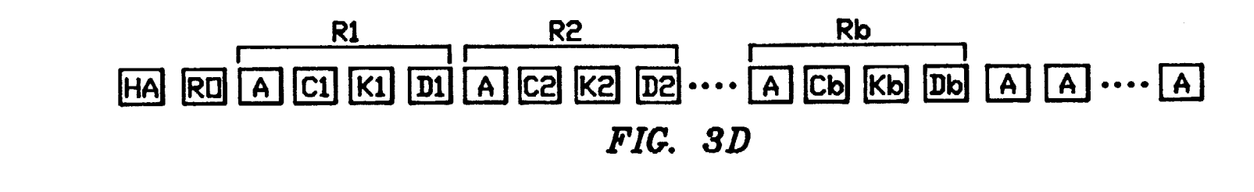
Figure 3E:
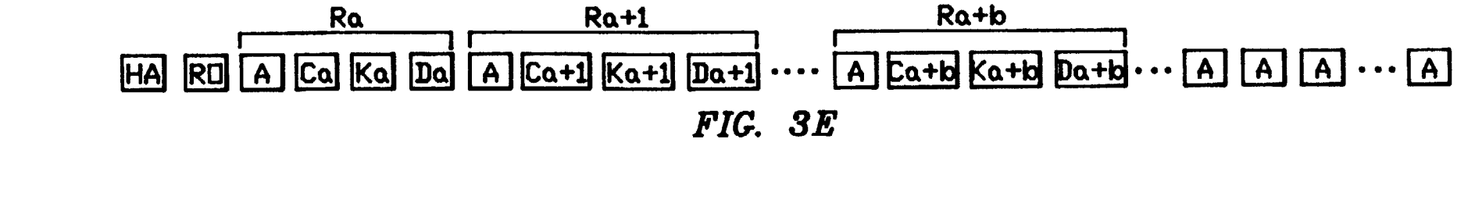
Figure 4A:
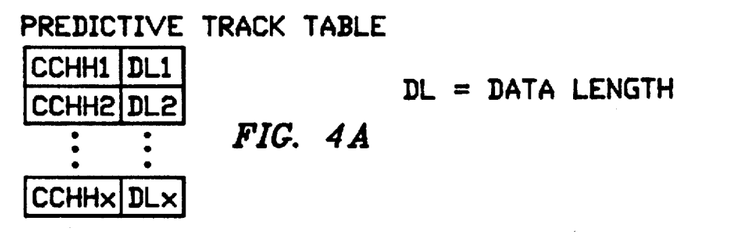
FIGS. 4A-E, show the Predictive Track Table formats of this invention corresponding to the predictive track formats of FIGS. 3A-E.

The other variations in FIGS. 3 and 4 can be understood by analogy to the discussion above and the discussion in connection with FIGS. 3A and 4A. For the predictive track definition illustrated in FIG. 3A, the last record number n can be calculated from DL and track capacity. For example, if the track capacity is 50 KB and the DL equals 4 KB, then the last record number n equals 12, because we can store twelve 4 KB records with 2 KB unusable track space. According to this predictive track definition, a track having only 3 such records, numbered 1-3, is not considered a predictive track because it does not store the maximum records number n.

Figure 4B:
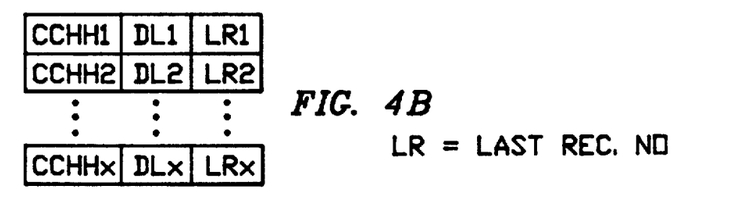

FIG. 3B expands the predictive track definition to include tracks with less than the maximum number of records. This is illustrated by showing record numbers R1 and R2 followed by a series of empty address markers (A). The advantage of the embodiment of FIG. 3B is that the number of predictive track hits is increased to include those references to partially empty predictive tracks. The disadvantage of this method is illustrated in FIG. 4B, which shows the necessary addition of a Last Record number (LR) field for each predictive track. The PTT in FIG. 4B requires the DASD controller to compute a new record number range for each predictive track in addition to the other computations discussed in connection with FIG. 4A.

Figure 4C:
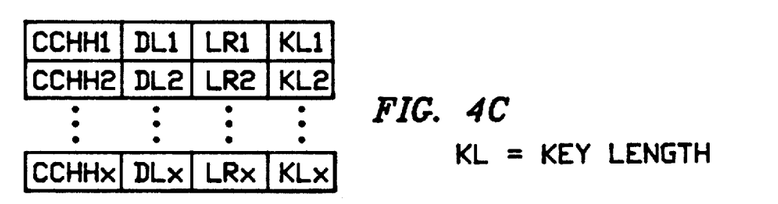
Figure 4D:
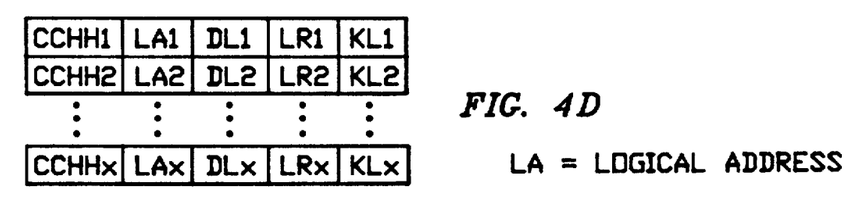
Figure 4E:
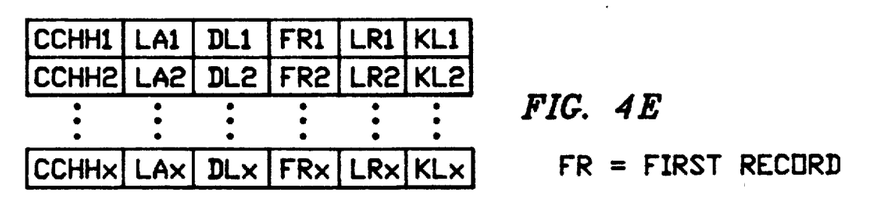

FIG. 3C illustrates a predictive track having identical non-zero key field lengths in all records on the track. In this case, as shown in FIG. 4C, this constant Key field Length (KL) must be stored in the PTT for each such predictive track. This is necessary because the channel program may update both key and data fields together and KL is necessary together with DL to perform CKD length checksum procedures. The embodiment illustrated in FIGS. 3C and 4C is not particularly interesting because it increases the size of the PTT with little concomitant increase in predictive track hit rate.

FIG. 3D illustrates yet another predictive track definition wherein the track is defined as predictive even if the logical track address CCHH in the HA and CAs is different from the physical CCHH (PA) in HA and CAs. In this case, for each such predictive track, the PTT in FIG. 4D requires the storage of an additional Logical Address (LA) field for the logical CCHH. Storage of LA increases the PTT space requirement but offers the additional advantage of supporting host operating systems such as VM that typically use different logical CCHH and physical CCHH. Note that FIG. 3D illustrates a monotonic sequence of record numbers from R1 through Rb followed by a series of unused address markers (A), indicating that such tracks need not be full.

An additional variation of this method can be implemented as a method in which the physical track address can be determined from the location or index of the PTT entry for a given track. Such PTT entries need not explicitly store the physical track address, thereby providing some storage economy. This variation can be further varied into two other methods. In one such variation, the logical track address is stored in the PTT entry and need not be equal to the physical track address. In a second such variation, the logical track address is constrained to always equal the physical track address and may also be omitted from the PTT, thereby economizing on storage.

This additional variation requires an unambiguous mapping from each physical track address to a single PTT entry for which many suitable schemes are known in the art. Most of such schemes may increase PTT size if the PTT is sparse with respect to contiguous physical track address, although segmented or multi-staged PTT organizations can minimize the space occupied by empty entries. Thus, this variation is perhaps most useful in situations where most tracks are predictive and thus represented in the PTT or where most of the contiguously-addressed tracks within sub-PTT groups are predictive and therefore represented in the PTT. In such cases, this variation leads to reduced PTT space requirements and smaller PTT entries without significant numbers of empty entries.

Rather than completely eliminating the physical CCH from the PTT, it is perhaps more useful to store a compacted version of the physical track number. For instance, storing $CC*15+HH$, where 15 is the number of tracks per cylinder, requires only two bytes instead of the normal four bytes. Alternatively, the low-order byte of the result of the computation of $CC*15+HH$ can be stored in the PTT entry, thereby saving three bytes of PTT space. Storage of even a single byte is useful for providing a cross-check of the controller microcode that points to the particular PTT entry for a given CCHH, thereby providing confidence that the proper PTT entry has been accessed.

By extension of the above discussion, it will be appreciated that the method of this invention may also be used for predictive tracks that have a first record number not equal to 1, as illustrated in FIG. 3E. Such predictive tracks must contain a monotonic sequence (increasing or decreasing) of record numbers $Ra-Ra+n$, but need not begin with record number R1. The PTT embodiment illustrated in FIG. 4E requires an additional First Record (FOR) field to identify the record number a. It will be really appreciated that the presence of both first and last record number fields, FR and LR, now permits the computation of the presence or absence of an updated record reference in any predictive track stored in PTT.

Another useful variation of an efficient PTT embodiment that will function with any of the variations discussed above is the implementation of a PTT compaction procedure whereby contiguous ranges of predictive tracks are combined into a single PTT entry. For example, if all tracks on the device are predictive and each have 12 4 KB records, then the PTT need only store the number 12 and size 4 KB to describe all tracks on the device. This method is particularly effective in situations where the logical CCHH differs from the physical CCHH such as for VM mini-disks. For such a mini-disk, a single staring physical CCHH and a single starting logical CCHH will suffice for the entire mini-disk PTT.

Such a scheme will work well in practice because many systems typically format entire cylinders with the same format. However, this extension of the method of this invention adds some complexity to PTT maintenance when, for example, a track in the middle of a similarly formatted range is reformatted differently from its neighbors. In such a case, a single entry in PTT to describe the entire range must be expanded to three entries; (1) to describe the early range up to the modified track, (2) to describe the modified track, and (3) a final entry to describe the range of tracks following the modified track.

Referring to FIG. 1, the entire PTT can be stored in memory (not shown) associated with controller 26. Alternatively, the portion of a PTT that is associated with a particular DASD 30 can be stored in a random access memory (not shown) associated with DASD.30. With the former approach, controller 26 must reserve sufficient memory to hold PTTs for all DASDs that may be attached to controller 26. In the latter case, whenever a new DASD is attached to controller 26, the new DASD brings enough RAM with it to hold its portion of PTT. The disadvantage with this latter scheme is that controller 26 must communicate with DASD through switch 28 to access PTT. Thus, the storage of PTT in memory (not shown) associated with controller 26 or with channel 24 is preferred.

It is preferable that PTT not be lost when controller 26 is powered off or experiences a power failure. One solution to this problem is the storage of PTT in a non-volatile RAM to survive power failures. Another suitable solution is to store the PTT in a RAM that is powered by battery for survival during power loss.

In such a case, a disk copy of the PTT can be made in addition to the RAM copy. A simple and suitable method for insuring validity of the PTT disk copy is to maintain an IML or token number appended to the end of the PTT. During normal controller operation, the disk copy would not be updated at every update of the RAM copy of the PTT, to avoid the performance penalties associated with frequent PTT dumps to disk. However, a current token value appended to the disk copy whenever the working PTT is written to disk serves to distinguish the continually-updated RAM PTT from the static PTT disk copy if the RAM PTT token is incremented at the first update following dump to disk.

At IML time, the controller immediately increments the token and then verifies that the PTT disk copy is valid before reloading to RAM from disk. At each IML, the controller IML number is first incremented and the PTT is then loaded from disk. During loading, the IML number field in the PTT disk copy is checked to ensure that it is exactly one less than the current IML number value. If so, the PTT is verified as the correct copy made to disk at the end of the previous IML session and may be reused. If not, the PTT disk copy is outdated and the PTT must be recovered from RAM or recreated by some suitable means such as a complete DASD scan or piecemeal recreation during normal DASD operation.

If the PTT in RAM has been updated and the controller then fails before the RAM PTT is saved to disk, the controller will discover at the next IML that the disk copy PTT token is valued two (2) less than the current IML value (one count at the disk dump and one count at controller recovery) and thus find the disk copy PTT invalid with respect to the RAM PTT conditions immediately before controller failure.

Two copies of the PTT should be maintained in controller 26 memory (not shown) to avoid single failure points. Also, the PTT can be organized to contain a "valid" byte for each track entry in the table. Thus, upon a host system request to reformat a track, the PTT entry corresponding to that track is first marked invalid. Following the completion of the formatting operation, the PTT entry for that track is updated with new values for DL and LR if the track remains predictive. Finally, the entry for the track is remarked as valid. This prevents the loss of PTT integrity that could result from system failures occurring during format write operations.

In addition to saving the PTT on disk as discussed above, the controller may also operate to save the PTT during DASD subsystem shutdown procedures, including shutdown occasioned by loss of external primary power. The process is the same in that the controller writes the RAM PTT copy to disk, appends the current token, and shuts down, thereby ensuring no further updates to the RAM PTT. If RAM PTT is retained using battery backup or other non-volatile support, the unchanged token is retained in the RAM PTT. As noted above, when the controller restarts following shutdown, it increments the separately-preserved PTT token value and tests the initial PTT copy from RAM or disk for a token value of one (1) less than the now-current controller token.

The method of this invention can be applied to controllers for CKD-emulation on FB systems. In one method known for CKD-emulation, each CKD record is stored starting at a new FB sector boundary. In such a method, both the count field and the start of the key or data field for each CKD record are stored in the same FB sector and these fields may span multiple sectors. Upon a request to update the data field of a record stored on a predictive track, if the track is not in cache, the sectors containing the records must first be copied into the controller buffer memory. Those portions of the sectors that contain the data field to be updated must then be changed. Finally, the updated sectors must be written back to the FB disk on the second revolution. With a Predictive Track Table, the update write requires only one disk revolution because the entire record is rewritten to the disk, including the count field of the record generated using PTT information and the data field received from the host channel. Therefore, in addition to eliminating disk access time from host response time, this PTT method also eliminates a disk access for this CKD/FB emulation technique.

This PTT method is also useful with another technique known for CKD-emulation in which all CKD records are packed tightly into FB sectors. In this technique, the PTT can eliminate a disk access for sequential track update writes such as those performed by DB2 logging. DB2 logging updates the data fields of every user record on the track (whole track update write). With PTT, the entire track can be recreated and written without a requirement for reading any portion of the track. Without PTT, the old value of the track must be read in a first revolution to permit reconstruction of the count fields and the write is then accomplished during a second revolution. This means that DB2 logging can be emulated at the speed of the FB device instead of at one-half speed of the native device as is normally required to permit each track to be first read and then written. The PTT method works because (a) the entire track is written at once, except for R0, and (b) the CKD-emulation scheme assigns a separate sector to R0 and packs user records only together on a track. This advantage of the method of this invention will be fully appreciated with reference to the Bohl reference cited above.

Finally, use of a PTT for CKD-emulation is found to eliminate the requirement for storage of the typical emulated count fields on FB disk sectors. This is possible because sufficient information exists in the PTT to recreate the count fields as necessary. Removing the count field storage requirement saves disk space and may also lead to improved performance.

However, if the PTT is employed to eliminate the usual requirement for storing emulated count field values, then the PTT reliability over time and during catastrophic DASD sub-system failures must be at least equal to the reliability of the data recorded on the DASD. If the PTT is employed to keep the only copy of essential DASD information, then the loss of PTT content could result in actual DASD data loss rather than a mere performance degradation. Recall that in the PTT method variations discussed above for enhancing DASD subsystem performance, loss of PTT contents leads only to normal non-PTT DASD performance levels until the PTT can be reconstructed by the DASD subsystem. Thus, reliance on PTT entries to recreate DASD count fields for FB disk sectors introduces a new risk of actual data loss that may not be acceptable to the system user.

Obviously, other embodiments and modifications of this invention will occur readily to those of ordinary skill in the art in view of this teachings. Therefore, this invention is to be limited only by the following claims, which include all such obvious embodiments and modifications when viewed in conjunction with the above specification and the accompanying drawings.

We claim:

1. In a channel controller having memory means for data storage and first transfer means for writing CKD formatted records to a DASD, said DASD containing a plurality of CKD formatted records stored in DASD tracks, said first transfer means including one or more NVS means for storing said records, a method for updating one or more host-specified records located in a DASD track, said method comprising steps of:
   (1) storing in a Predictive Table Track (PTT) in said memory means a plurality of track and record descriptors identifying the DASD track in which each aid CKD formatted record is located;
   (2) updating at least one said host-specified record in said memory means to produce an updated host-specified record in said memory means;
   (3) ascertaining, by reference to said Predictive Track Table, the DASD track in which said at least one host-specified record is located;
   (4) writing said updated host-specified record to said NVS means; and
   (5) transferring said updated host-specified record to said DASD track asynchronously from said NVS means.

2. The method of claim 1 wherein said memory means includes cache means for buffer storage of DASD records and said method further comprises, following said storing step, the additional step of:
   (1.1) examining said cache means for the presence of said host-specified record and bypassing said ascertaining step, said writing step and said transferring step for each said host-specified record found to be present in said cache means.

3. The method in claim 2 wherein:
said DASD tracks include one or more predictive tracks containing a plurality of predictive records having substantially equal-sized keyfields and substantially equal-sized data fields, said predictive records being arranged along each said predictive track in monotonic record number order; and
said track and record descriptors include, for all said predictive tracks, the physical and logical CCHH fields for each said predictive record, the first and last predictive record number for each said predictive track, the size of said substantially equal-sized data fields and the size of said substantially equal-sized key fields.

4. The method in claim 2 wherein:
said DASD tracks include one or more predictive tracks containing a plurality of predictive records having substantially equal-sized key fields and substantially equal-sized data fields, said predictive records being arranged along each said predictive track in monotonically increasing record number order beginning with record number 1; and
said track and record descriptors include, for all said predictive tracks, the physical and logical CCHH fields for each said predictive record, the last predictive record number for each said predictive track, the size of said substantially equal-sized data fields and the size of said substantially equal-sized key fields.

5. The method in claim 2 wherein:

said DASD tracks include one or more predictive tracks containing a plurality of predictive records having substantially equal-sized key fields and substantially equal-sized data fields, said predictive records having identical physical and logical CCHH fields and being arranged along each said predictive track in monotonically increasing record number order beginning with record number 1; and said track and record descriptors include, for all said predictive tracks, the physical CCHH field for each said predictive record, the last predictive record number for each said predictive track, the size of aid substantially equal-sized data fields and the size of said substantially equal-sized key fields.

6. The method in claim 2 wherein:

DASD tracks include one or more predictive tracks containing a plurality of predictive records having substantially equal-sized data fields and no key fields, said predictive records having identical physical and logical CCHH fields and being arranged along each said predictive track in monotonically increasing record number order beginning with record number 1; and said track and record descriptors include, for all said predictive tracks, the physical CCHH field for each said predictive record and the last predictive record number for each said predictive track.

7. The method in claim 2 wherein:

said DASD tracks include one or more predictive tracks filled with a plurality of predictive records having substantially equal-sized data fields and no key fields, said predictive records having identical physical and logical CCHH fields and being arranged along each said predictive track in monotonically increasing record number order beginning with record number 1 and ending with a predetermined record number; and said track and record descriptors include, for all said predictive tracks, the physical CCHH field for each said predictive record.

8. A method for managing the updating of CKD formatted records located on predictive tracks in a DASD in which the path to said DASD is provided through a cache storage means and at least one Non-Volatile Storage (NVS) means, an update reference to one or more records already present in said cache storage means being denominated of a "fast-write hit" and an update reference to one or more records not present in said cache storage means being denominated a "fast write miss", said fast-write miss referring to a missed record, said method comprising the steps of:

(a) storing a Predictive Track Table (PTT) including count and length descriptors of CKD records located in said predictive tracks;

(b) responsive to a fast-write miss referring to at last one missed record, ascertaining, by reference to said stored Predictive Track Table descriptors, whether said at least one missed record is located on a predictive track; and (c) writing said at least one missed record to said cache storage means and to said Non-volatile Storage means if said at least one missed record is located on a predictive track, and subsequentially asynchronously transferring said at least one missed record to said DASD predictive track from either said storage means.

9. The method of claim 8 wherein a predictive track includes CKD formatted records having substantially equal-sized data fields, having no key fields and having count fields whose record identification numbers monotonically change from record to record along said predictive track.

* * * * *

UNITED STATES PATENT AND TRADEMARK OFFICE
CERTIFICATE OF CORRECTION

PATENT NO. : 5,283,884
DATED : February 1, 1994
INVENTOR(S) : Menon et al

It is certified that error appears in the above-indentified patent and that said Letters Patent is hereby corrected as shown below:

Claim 1, Col. 14, line 17, please change "aid" to --said--

Claim 8, Col. 16, line 20, please change "last" to --least--.

Col. 1, line 67, please change "R)" to --RO-- and,

Signed and Sealed this

Twenty-sixth Day of July, 1994

Attest:

BRUCE LEHMAN

*Attesting Officer*   *Commissioner of Patents and Trademarks*